United States Patent
Chalandon et al.

(10) Patent No.: US 9,683,595 B2
(45) Date of Patent: Jun. 20, 2017

(54) ROUGH METALLIC LOCKING WASHER

(71) Applicant: Nord-Lock International AB, Göteberg (SE)

(72) Inventors: Pierre Chalandon, Saint-Étienne (FR); Stéphane Meunier, Bourg Argental (FR); Christophe Delcher, Fraisses (FR)

(73) Assignee: NORD-LOCK INTERNATIONAL AB, Göteborg (SE)

( * ) Notice: Subject to any disclaimer, the term of this patent is extended or adjusted under 35 U.S.C. 154(b) by 13 days.

(21) Appl. No.: 14/427,874

(22) PCT Filed: Sep. 12, 2013

(86) PCT No.: PCT/SE2013/051066
§ 371 (c)(1),
(2) Date: Mar. 12, 2015

(87) PCT Pub. No.: WO2014/042584
PCT Pub. Date: Mar. 20, 2014

(65) Prior Publication Data
US 2015/0219143 A1 Aug. 6, 2015

(30) Foreign Application Priority Data
Sep. 12, 2012 (FR) .................................... 12 58566

(51) Int. Cl.
*F16B 39/24* (2006.01)
*F16B 2/00* (2006.01)
*F16B 43/00* (2006.01)

(52) U.S. Cl.
CPC .............. *F16B 39/24* (2013.01); *F16B 2/005* (2013.01); *F16B 43/00* (2013.01)

(58) Field of Classification Search
CPC .......... F16B 2/005; F16B 39/24; F16B 39/32; F16B 39/282; F16B 43/00
(Continued)

(56) References Cited

U.S. PATENT DOCUMENTS 3,241,589 A * 3/1966 Enders .................... F16B 39/24
411/135
3,263,727 A * 8/1966 Herpolsheimer ....... F16B 39/24
411/136
(Continued)

FOREIGN PATENT DOCUMENTS

CN 1091813 A 9/1994
CN 2559823 Y 7/2003
(Continued)

OTHER PUBLICATIONS

Chinese Office Action dated Dec. 30, 2015 of corresponding Chinese Patent Application No. 201380047568.2—9 pages.
(Continued)

*Primary Examiner* — Roberta Delisle
(74) *Attorney, Agent, or Firm* — Knobbe Martens Olson and Bear, LLP

(57) ABSTRACT

A metallic locking washer is configured to be mounted in a screw/nut system to engage between a nut and a bearing element. The metallic locking washer has a contact face suitable for coming into contact with one or the other of the nut and the bearing element. The contact face has a surface that is suitable for being brought along in friction against one or the other of the nut and the bearing element when the nut loosens. The contact face is coated, by thermal projection of an additive material, with a rough coating forming a rough surface, which increases the friction forces between the contact face of the metallic washer and one or the other of the nut and the bearing element.

9 Claims, 2 Drawing Sheets

(58) Field of Classification Search
USPC .................................. 411/145, 147, 531, 534
See application file for complete search history.

(56) References Cited

U.S. PATENT DOCUMENTS

| | | | | |
|---|---|---|---|---|
| 3,332,464 | A * | 7/1967 | Castel | F16B 39/24 411/147 |
| 3,417,802 | A * | 12/1968 | Oldenkott | F16B 39/24 411/134 |
| 3,438,416 | A * | 4/1969 | Thurston | F16B 39/24 411/134 |
| 4,538,313 | A * | 9/1985 | Frieberg | B21D 53/20 411/149 |
| 4,708,555 | A * | 11/1987 | Terry | F16B 39/24 411/149 |
| 4,778,730 | A | 10/1988 | Zucker | |
| 4,900,209 | A * | 2/1990 | Reynolds | F16B 37/044 411/112 |
| 5,090,855 | A * | 2/1992 | Terry | F16B 39/24 29/525.02 |
| 5,203,656 | A * | 4/1993 | McKinlay | F16B 39/282 411/149 |
| 5,314,279 | A * | 5/1994 | Ewing | F16B 39/282 411/134 |
| 6,347,915 | B1 * | 2/2002 | Balzano | F16B 39/282 411/149 |
| 6,966,735 | B1 * | 11/2005 | Yamazaki | F16B 39/24 411/131 |
| 7,168,902 | B2 * | 1/2007 | Terry | F16B 31/04 411/149 |
| 7,192,232 | B2 * | 3/2007 | Esser | F16B 43/00 411/154 |
| 2002/0015628 | A1 | 2/2002 | Hartmann et al. | |
| 2005/0089385 | A1 * | 4/2005 | Lin | F16B 39/24 411/154 |
| 2006/0216129 | A1 * | 9/2006 | Lin | F16B 39/282 411/161 |
| 2007/0243040 | A1 * | 10/2007 | Chen | F16B 39/282 411/161 |
| 2008/0014046 | A1 * | 1/2008 | Bauer | F16B 39/24 411/164 |
| 2009/0142155 | A1 * | 6/2009 | Su | F16B 39/2825 411/7 |
| 2010/0119326 | A1 | 5/2010 | Burtsche et al. | |
| 2013/0243544 | A1 | 9/2013 | Delcher | |

FOREIGN PATENT DOCUMENTS

| | | |
|---|---|---|
| CN | 101449047 A | 6/2009 |
| CN | 201496380 U | 6/2010 |
| CN | 201973055 U | 9/2011 |
| DE | 10 2006 023398 A1 | 11/2007 |
| DE | 10 2008 046911 A1 | 4/2010 |
| DE | 10 2008 056368 A1 | 5/2010 |
| FR | 2 961 869 A1 | 12/2011 |
| JP | S6297314 U | 6/1987 |

OTHER PUBLICATIONS

International Search Report issued in PCT Application No. PCT/SE2013/051066, filed Sep. 12, 2013.
PCT, International Preliminary Report on Patentability, re PCT Application No. PCT/SE2013/051066, mailing date Aug. 7, 2014.
Office Action dated Aug. 19, 2016 of corresponding Chinese Patent Application No. 201380047568.2—16 pages.
Office Action Mar. 17, 2017 of corresponding European Patent Application No. 13 773 430.7—4 pages.

* cited by examiner

ROUGH METALLIC LOCKING WASHER

CROSS-REFERENCE TO RELATED APPLICATIONS

This application is the U.S. National Phase under 35.U.S.C. §371 of International Application PCT/SE2013/051066, filed Sep. 12, 2013, which claims priority to FR Patent Application No. 1258566, filed Sep. 12, 2012.

The present invention relates to a metallic locking washer intended for being mounted in a screw/nut system.

In the assembly field where screw/nut systems are used, it is a requirement that the nuts do not loosen. Also, eg a washer with radial ridges is interposed between an element to be screwed and a nut which are traversed by a threaded shank member, in order to thereby increase the friction forces between the ribbed washer and the element to be screwed and the nut. In this way, after the nut has been tightened, the washer is held in a vise-grip between the element to be screwed and the nut. Also the loosening thereof, eg due to vibrations, is braked precisely due to the radial ridges. The radial ridges actually allow an increase of the friction forces between the contacting surfaces.

Such radial ridges are also implemented on locking washers having two washer crowns. Such locking washers comprise two washer crowns applied coaxially against each other, and they are caused to engage between the bearing element and the nut. Each of them has an engagement face and an opposite, ridged bearing face. The engagement face has asymmetrical radial teeth having, on one hand a crest and a tooth bottom spaced angularly from the crest and, on the other hand, two opposed sides. One of the sides is substantially inclined relative to the median plane defined by the washer crown, and it extends angularly between the crest and the tooth bottom. It is intended to form a sliding side. The angle having the greatest slope of the substantially inclined sides relative to the median plane must be substantially greater than the helix angle of the screw/nut system. The other side is substantially perpendicular to the inclined side of the following tooth, and it constitutes a stop side. Thus, the engagement faces of the washer crowns are intended for being applied against each other, such that, on the one hand, the inclined sliding sides come into contact with each other, respectively, and, on the other hand, the stop sides come into abutment on each other, respectively.

Also, when the nut is tightened, the locking washer is held in a vise-grip between the bearing element and the nut, and the engagement faces are then brought along axially against each other under pressure. In turn, when the nut tends to loosen, it brings along the washer crown against which it bears in rotation due to the radial ridges, and consequently the sliding sides of that washer crown are brought along slidingly against the sliding sides of the other washer crown, while forming a ramp. In this manner, the washer crowns are separated axially from each other according to a modulus which is higher than that of the translation movement of the nut relative to the screw. And the axial tension which is exercised in the screw/nut system increases significantly. Owing to that, the friction forces generated in the screw/nut system increase considerably and bring about the locking of the nut against rotation. More specifically, since the sliding side is inclined relative to the axis of the screw/nut system at an angle greater than that of the helix angle of the system, once the nut brings the washer crown into rotation when it loosens, the latter is brought along axially against it, and locks it by wedge effect.

However, the roughness of surface resulting from the implementation of radial ridges does not, in certain implementation conditions, allow the achievement of friction forces that are sufficiently high for braking the loosening of the screws; that is the case eg when the hardness of the opposite material is too high. Besides, the radial ridges are susceptible to marking the opposing elements considerably and thus provoking incipient fractures, in particular fatigue fractures, in metallic materials. Such markings are also detrimental to non-metallic elements such as composite materials. Also, a problem that arises and which the present invention is aimed at solving is to provide a metallic locking washer that allows not only to increase the friction forces between the contact faces, but also to preserve the opposing elements on which they bear.

To this end, the present invention proposes a metallic locking washer intended for being mounted in a screw/nut system to enter into engagement between a nut and a bearing element, said metallic locking washer having a contact face suitable for coming into contact with one or the other of the nut and the bearing element, said contact face having a surface which is suitable for being brought along in friction against one or the other of the nut and the bearing element when the nut loosens. According to the invention, the contact face is coated, by thermal projection of an additive material, with a rough coating forming a rough surface in order to enable an increase in the friction forces between the contact face of the metallic washer and one or the other of the nut and the bearing element.

Thus, due to the provision of a coating being uniformly distributed on the surface of the washer, imperfections are formed in the shape of ridges or grooves, whereby homogeneously distributed peaks or valleys appear, and hereby a uniform roughness is obtained that allows an increase in the friction forces against said surface without thereby causing damage to the nut or the bearing element. The friction forces of the surfaces in contact obtained due to the coating according to the invention are superior to those obtainable, for instance, by the mechanical provision of radial ridges in a washer. The distance between two consecutive ridges or grooves, or between two peaks, is for instance comprised, on average, between tens of microns and a millimetre.

Besides, particularly advantageously, the mean depth of roughness R of the rough coating is higher than ten micrometres, and preferably higher than 20 micrometers. This value corresponds to the mean of the distances between the protrusions and the hollows of the grooves. It shows the pattern of the imperfections of the rough surfaces. The value corresponds essentially to a value of the arithmetic mean deviation of the profile of the imperfections Ra of two micrometers. The latter value is connected to the mean line which is a straight line having a direction which is generally in parallel with the surface and which divides the protrusions and the hollows in such a way that, for a determined length, the sum of squares of the deviations from that mean line is minimal.

Also, advantageously the rough coating has a Vickers hardness of more than 500 Hv. In this way, the hardness of the coating is, in the majority of cases, higher than the hardness of the material of the metallic washer, whereby it is enabled to significantly improve the resistance to wear and deformation of the imperfections, and thus to maintain the roughness eg despite alternation between mounting and dismounting.

Additionally, according to a particularly advantageous embodiment, the surface of the metallic washer is cleaned prior to it being coated in order to thereby increase the bonding between the coating and the surface. The additive material will actually become lodged in the irregularities of the metallic washer, and thus better anchoring of the coating is allowed.

For instance, the surface of the metallic washer is cleaned mechanically. Preferably, the surface of the washer is subjected to initial degreasing.

According to a particularly preferred embodiment of the invention, the metallic locking washer is flat. For instance and in accordance with the invention, the two opposing bearing faces of a washer with two washer crowns are processed, respectively. In this way the two crowns may become anchored in the nut and in the element to be tightened, respectively, whereas the two engagement faces are suitable for sliding against each other. According to a particular embodiment, the metallic locking washer is conical, be it single or having two washer crowns, in order to maintain an axial tension in the screw/nut-system.

According to a particularly preferred embodiment of the invention, the additive material is tungsten carbide or chromium carbide. Thereby a coating is obtained whose Vickers hardness is within the range of 800 to 1500 Hv, and the wear of which is consequently extremely low despite alternation between tightening and unscrewing operations. Besides, the additive material preferably also comprises cobalt, and, with the tungsten carbide, the Vickers hardness thereby becomes even higher.

In respect of the thermal projection, the additive material is preferably projected through plasma.

Other characteristic features and advantages of the invention will become apparent by reading of the following description of particular embodiments of the invention, given as non-limiting, illustrative examples with reference to the accompanying drawing, wherein.

Figure 1A:
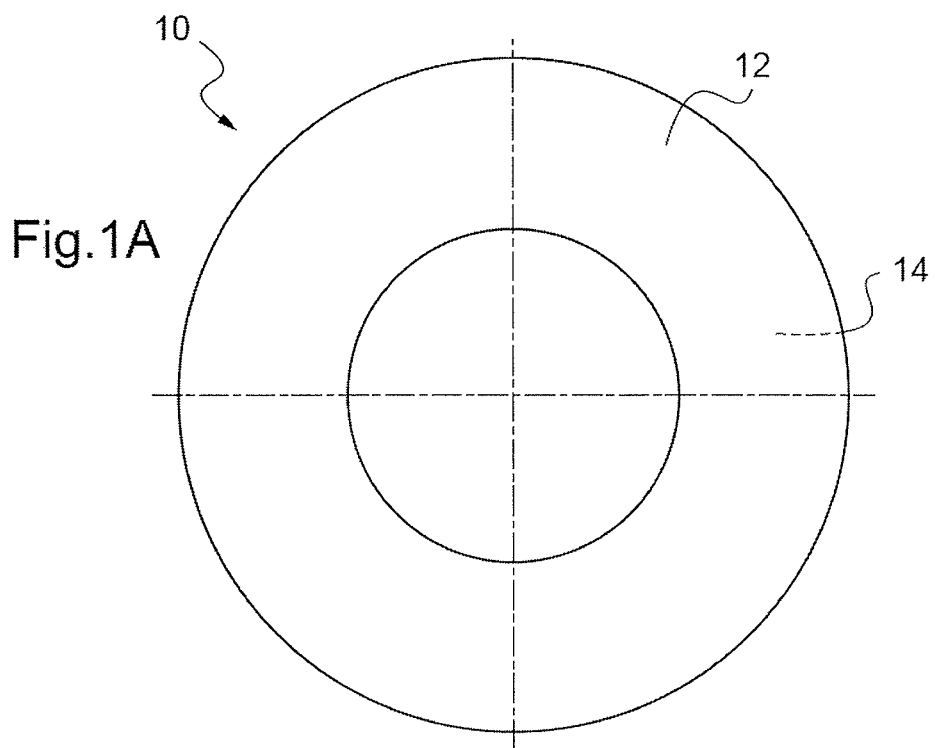
FIG. 1A is a schematic view, seen from above, of a first metallic locking washer coated in accordance with the invention

The subject invention is a metallic locking washer having at least one face whose surface is rough in order to thereby increase, in parallel, the friction forces of the surfaces in contact in a screw/nut system.

To that end, the contact face is coated with a rough coating which is realised by thermal projection of an additive material. This is how the rough surface is formed.

Thus, by means of a vector gas allowing acceleration and transportation of particles of an additive material at elevated temperature to the surface of the washer, the latter is coated with a rough coating of the additive material.

Common thermal projection techniques may be used to advantage. Examples of such techniques include plasma type, projection by jet texturing, wire arc, cold projection or by detonation gun.

The plasma technique uses a plasma torch which allows melting and acceleration of the additive material towards the surface to be treated in order to form the coating. The projection by jet texturing consists in creating a flame having a very high gas ejection speed for melting and accelerating the additive material. The wire-arc technique uses a cold gas vector, e.g. air, and a power source creating an electric arc between two wires of the additive material.

The material melts and is entrained by the vector gas, against the surface to be treated, while the wires are continuously unwound. In respect of the cold projection, it consists of accelerating, at very high speed, the additive material in powder form in order to obtain thermal transformation thereof during the impact with the surface to be treated. As regards the detonation gun technique, it allows a very rapid acceleration at elevated temperature of the particles of the additive material.

Various additive materials are suitable, in the shape of powders or wires, for exercising the method of the invention. Attention is for example drawn to tungsten carbide, designated WC, which is below applied onto a locking washer. The tungsten carbide may also be associated with cobalt or nickel in order to increase the hardness of the coating. Due to the cobalt the coating will have an improved resistance to corrosion which is linked directly to, the chemical composition, the thickness, and the porosity of the deposit. Obviously, other materials may be considered as long as they make it possible to provide a coating that has elevated hardness levels as well as a rough surface as will be explained. Examples thus include chromium carbide, boron nitride, chromium oxides, aluminium oxides, or certain ceramic materials.

Besides, the surface of the metallic washer to be coated is advantageously cleaned prior to being coated. Preferably, it is also degreased initially. The cleaning as such then permits improved anchoring of the coating on the metallic washer. It may be accomplished eg by blasting or by peening. Other surface preparation techniques may be used, eg purely chemical ones, or else mechanical-chemical techniques, and such that lead to the depositing of a basis layer of nickel-chromium to enable good anchoring of the coating. That layer also permits improvement of the corrosion resistance of the washer, and the roughness of the coating is enhanced.

Figure 1B:
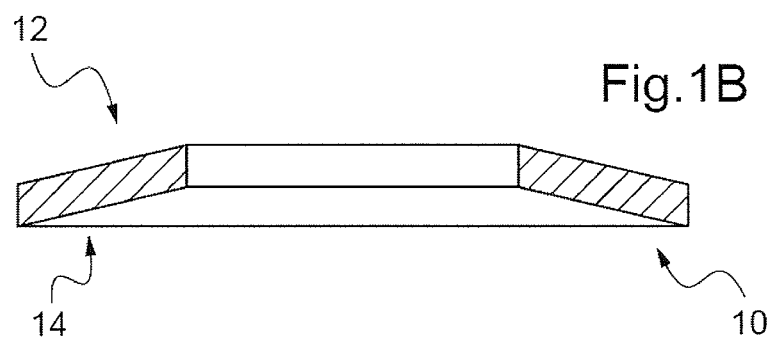
FIG. 1B is a schematic axial view of the metallic washer shown in FIG. 1A.

Thus, a conical locking washer 10 as shown in FIGS. 1A and 1B has been coated by thermal projection of an additive material with a rough coating forming a rough surface. The washer has two opposed faces 12, 14 whose respective surfaces were initially cleaned prior to their being coated with tungsten carbide as additive material.

The coating thickness thus obtained is 250 µm, and its Vickers hardness is 1000 Hv. Besides, the average depth of roughness R of the coating is 32.5 µm which corresponds substantially to an arithmetic mean deviation Ra of 6.5 µm. By such roughness, the coating has a mean coefficient of friction of 0.2, and thus friction forces are obtained that are sufficiently high for avoiding the loosening of the screws, as will be explained in the following, in two different modes of operation.

Besides, the coating has excellent resistance to corrosion, and it may resist elevated temperatures in the order of 500° C.

Thus, the conical locking washer 10 has been tested in a screw/nut assembly in conditions of axial tension of 41,800 Newton, while alternating successively between five tightening and unscrewing operations. Hereby both the tightening torque necessary for being put under axial tension of 41,800 Newton and the frictions of the screw head against a bearing element are measured.

The results will appear from the following table I by comparison to a conventional, non-coated metallic washer.

TABLE I

Tests under axial tension of 41,800 N

|  | Coated washer | | Non-coated washer | |
| --- | --- | --- | --- | --- |
|  | Torque (in N · m) | Friction under head | Torque (in N · m) | Friction under head |
| Tightening 1 | 141.38 | 0.190 | 120.30 | 0.150 |
| Tightening 2 | 146.31 | 0.201 | 105.45 | 0.135 |
| Tightening 3 | 158.24 | 0.232 | 125.56 | 0.165 |
| Tightening 4 | 171.43 | 0.265 | 102.40 | 0.141 |
| Tightening 5 | 183.88 | 0.295 | 98.41 | 0.159 |
| Average | 160.25 | 0.237 | 110.42 | 0.150 |

Thus, an average coefficient of friction under the screw head relative to the contact face of the locking washer 10 of 0.24 is obtained, where the coated washer is concerned, and of 0.15 where the non-coated washer is concerned. Also the advantages of the coated washer will appear clearly since the higher the friction underneath the head, the lower the risk that the possibilities for unscrewing of the screw/nut system are high.

Thus, the coating has a very elevated hardness and a roughness which is sufficiently high for ensuring a mechanical anchoring of all of the materials against each other. The advantage of this solution is to create a mechanical micro-anchoring ensuring an elevated, controlled and constant friction coefficient, quasi-independent of the material there against, whether it is metallic or non-metallic of composite type, whether it is dry, greased or even lubricated; and this without generating surface imperfections that are susceptible to creating the onset of fissures and propagation to fatigue fractures.

Besides, the thickness of the deposit stays low while ensuring its durability. The internal tensions it undergoes are low, and its fatigue and calking strengths, especially during tightening/unscrewing operations, are high. Furthermore, it may tolerate strong elastic deformations during tightening/unscrewing operations when the washers are conical.

Figure 2:
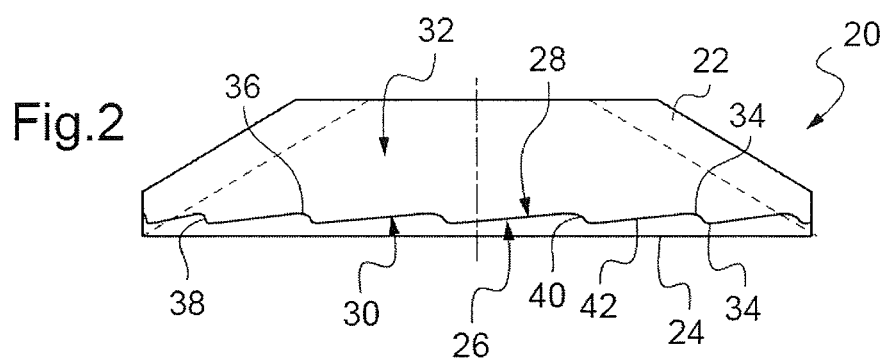
FIG. 2 is a schematic view of a second metallic locking washer coated in accordance with the invention.

Such type of coating has also been implemented on a locking washer 20 with two washer crowns as shown in FIG. 2.

It comprises two crowns 22, 24 applied coaxially against each other and engaging between a bearing element and a screw head. Each of the crowns 22, 24 has an engagement face 26, 28 and an opposite coated bearing face 30, 32. The opposite, coated bearing face 30, 32 constitutes the contact surface. The engagement faces have radial asymmetrical teeth 34 having, on the one hand, a crest 36 and a tooth bottom 38 spaced angularly from the crest 36, and, on the other hand, two opposed sides 40, 42. One of the sides 42 is substantially inclined relative to the median plane defined by the crown, and it extends angularly between said crest 36 and said tooth bottom 38. It is intended to form a sliding side. The angle having the greatest slope of the substantially inclined sides 42 relative to the median plane must be substantially greater than the helix angle of the screw/nut system. The other side 40 is substantially perpendicular to the inclined side of the following tooth, and it constitutes a stop side. Thus, the engagement faces 26, 28 of the washer crowns are intended for being applied against each other, such that, on the one hand, the inclined sliding sides 42 come into contact with each other, respectively, and, on the other hand, the stop sides 40 come into abutment on each other, respectively.

The opposing bearing faces 30, 32 are then coated with tungsten carbide as additive material, just like the conical locking washer 10 mentioned above.

Thus, when the locking washer 20 with two washer crowns comes into engagement between a screw head and a bearing element, the opposite coated bearing faces 30, 32 are caused to respectively abut on the screw head and, oppositely, on the bearing element. By the roughness of the bearing faces 32, the coefficient of friction of the screw head against one of the bearing faces 32 and, respectively, of the other bearing face 30 against the bearing element is increased compared to a non-coated locking washer.

Thus, when the screw has a propensity to loosen, the screw head will engage with the one of the bearing faces 32, and bring along in rotation the corresponding washer crown 22 relative to the other washer crown 24, whose other bearing face 30 stays in engagement with the bearing element. Thus, the two washer crowns 22, 24 will tend to be brought along in rotation relative to each other, and the sliding sides 42 against each other, which, by wedge effect with the screw, makes it possible to stop the unscrewing process.

In this way, by the rough coating, improved anchorage is obtained of the abutment faces 32, 30, and, consequently, an improved sliding effect of the sliding faces which in itself enables improved locking.

A series of tests have been made on another type of conical washers, washers having a diameter of 16 mm, while coating them with different coatings in accordance with different processes and different implementations. Thus, apart from the plasma technique, the arc-wire technique is used. Additionally, apart from tungsten carbide, chromium carbide has also been used. Different thicknesses have been applied, and one single run or two runs. Consequently, different surface roughnesses were obtained, and friction measurements were made after a first tightening, a second tightening, and a third tightening in a screw/nut assembly under axial tension of 115,000 N.

The results of those tests are given in Table II below.

TABLE II

| Tests | Roughness Ra | Tightening 1 | Tightening 2 | Tightening 3 |
| --- | --- | --- | --- | --- |
| 1 | 3.29 | 0.152 | 0.124 | 0.132 |
| 2 | 3.9 | 0.177 | 0.126 | 0.136 |
| 3 | 3.66 | 0.182 | 0.156 | 0.158 |
| 4 | 5.21 | 0.221 | 0.161 | 0.116 |
| 5 | 5.13 | 0.225 | 0.152 | 0.123 |
| 6 | 5.34 | 0.234 | 0.150 | 0.117 |
| 7 | 4.82 | 0.214 | 0.141 | 0.148 |
| 8 | 4.87 | 0.226 | 0.140 | 0.114 |
| 9 | 5.89 | 0.208 | 0.159 | 0.119 |
| 10 | 6.05 | 0.201 | 0.171 | 0.100 |
| 11 | 7.27 | 0.243 | 0.193 | 0.109 |
| 12 | 16.8 | 0.190 | 0.180 | 0.170 |
| 13 | 9.7 | 0.220 | 0.220 | 0.200 |

The three first tests, numbered 1 through 3, correspond to a washer coated with chromium carbide by means of the plasma technique according to a first work process and according to the respective thicknesses of: 50 μm, 100 μm, and 150 μm, in one single run.

The three following tests, numbered 4 through 6, correspond to a washer coated with tungsten carbide by means of the plasma technique according to said first work process and according to the respective thicknesses of: 50 μm, 100 μm, and 150 μm, in one single run.

The two following tests, numbered 7 and 8, correspond to a washer coated with tungsten carbide by means of the plasma technique according to said first work process and according to the respective thicknesses of: 50 μm and 100 μm, in two runs.

The two following tests, numbered 9 and 10, correspond to a washer coated with tungsten carbide by means of the plasma technique according to another work process and according to the respective thicknesses of: 50 μm and 100 μm, in one single run.

The three last tests, numbered 11 through 13, correspond to a washer coated with chromium carbide by means of the arc-wire technique according to three different work processes. However, the coefficients of friction obtained with the arc-wire technique are superior to those obtained by the other techniques, and they are obtained at an advantageous cost.

Thus, compared to a reference coefficient of friction of 0.150, corresponding to a conical washer having the same non-coated dimension, a gain of more than 40% is obtained with the coated washers.

Besides, a deposit of lamellar zinc of 10 μm is advantageously applied onto the washer coated with chromium carbide by the arc-wire technique in order to improve the corrosion resistance.

Figure 3A:
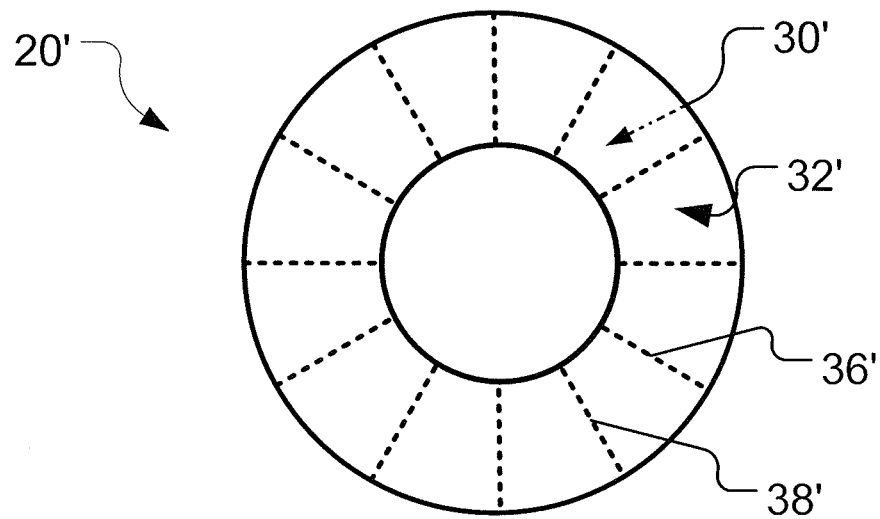
FIG. 3 is a schematic view of a flat metallic locking washer in accordance with the invention.
Figure 3B:
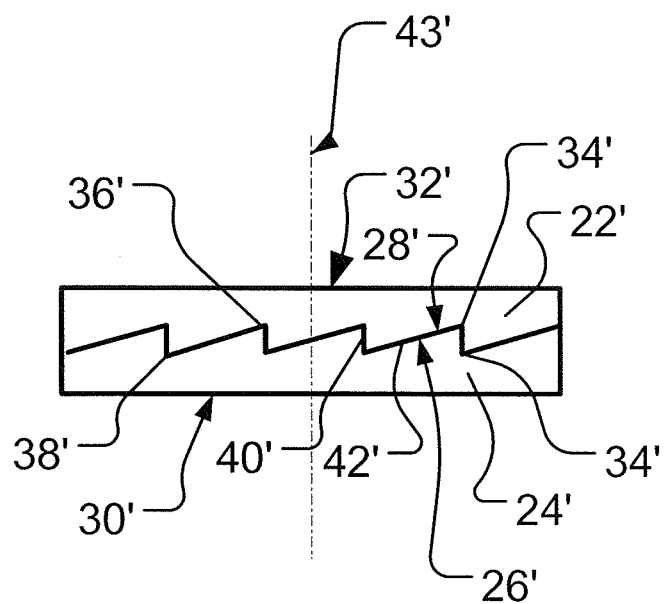

The above described examples are made with conical locking washers, there should be understood that the invention as discussed briefly above also is applicable to a flat locking washer comprising two washer crowns. As an example of this it is disclosed in FIG. 3 A locking washer 20' with flat configuration. The locking washer 20' comprises two crowns 22', 24' applied coaxially against each other and intended for example to be applied between a bearing element and a screw head. Each of the crowns 22', 24' has an engagement face 26', 28'. The opposite face 30', 32' is the coated bearing face and constitutes the contact face. The engagement faces 26', 28' have radial asymmetrical teeth 34', also named cams. The asymmetrically teeth 34' have a crest 36' and a tooth bottom 38' spaced angularly from the crest 36'. The dotted lines of FIG. 3A discloses the position of tooth bottom 38' and the crests 36' schematically. When the locking washer 20' is assembled with the two crowns 22', 24', the crests 36' and the tooth bottoms 38' cannot thus be seen from the position of the locking washer 20' of FIG. 3A. Contact surfaces 30' and 32' are also disclosed in FIG. 3A, the contact surface 30' is positioned at the opposite side of the locking washer 20' as disclosed in FIG. 3B. The crests 36' and the tooth bottoms 38' are as can be seen spaced angularly. Even though the crests 36' and the tooth bottom 38' is disclosed in FIGS. 3A and 3B as being positioned at the same angular position, this is not to be taken as exact. This is merely an example and it should be understood that the side 40' can be angled to to the centrum line 43' of the washer, and it need not have a straight shape, and as described below preferably the side 40' is angled substantially perpendicular to the side 42'. And further, the sides 42' is substantially inclined relative to the median plane defined by the crown, and it extends angularly between said crest 36' and said tooth bottom 38'. It is intended to form a sliding side. The angle having the greatest slope of the substantially inclined sides 42' relative to the median plane must be substantially greater than the helix angle of the screw/nut system, for witch it is intended to be applied. The other side 40' is substantially perpendicular to the inclined side of the following tooth, and it constitutes a stop side. Thus, the engagement faces 26', 28' of the washer crowns are intended for being applied against each other, such that, on the one hand, the inclined sliding sides 42' come into contact with each other, respectively, and, on the other hand, the stop sides 40' come into abutment on each other, respectively.

The opposing faces 30', 32' are thus coated as described by the description above with a rough coating. Thus when a screw is unscrewed as discussed above together with washer 20, a wedge effect will occur, due to the coating of the contact faces 30', 32' giving rise to increased friction, and thus causing the washer crowns 22', 24', to rotate relative to each other, creating a wedge locking effect.

The invention claimed is:

1. A metallic locking washer configured to be mounted in a screw/nut system to engage between a nut and a bearing element, said metallic locking washer comprising a contact face suitable for coming into contact with either or both of the nut or the bearing element, said contact face comprising a surface which provides friction against either or both of the nut or the bearing element when the nut loosens,
   wherein said contact face is coated, by thermal projection of an additive material, with a coating forming a rough surface, which increases the friction forces between the contact face of the metallic washer and either or both of the nut and the bearing element, wherein the metallic locking washer is a locking washer with two washer crowns,
   wherein the coating of additive material is uniformly distributed over the contact face of the washer, such that the washer has homogenously-distributed imperfections formed in the shape of ridges or grooves, thereby providing a uniform roughness on the contact face.

2. The metallic locking washer of claim 1, wherein the average depth of roughness R of the coating is higher than ten micrometers.

3. The metallic locking washer of claim 1, wherein the coating has a Vickers hardness of more than 500 Hv.

4. The metallic locking washer of claim 1, wherein the metallic locking washer is flat.

5. The metallic locking washer of claim 1, wherein, processing the metallic locking washer such that it is conical.

6. The metallic locking washer of claim 1, wherein the additive material is tungsten carbide or chromium carbide.

7. The metallic locking washer of claim 6, wherein the additive material additionally comprises cobalt.

8. The metallic locking washer of claim 1, wherein the two washer crowns are configured to be applied coaxially against each other, wherein each of the washer crowns have an engagement face comprising asymmetrical radial teeth, wherein the slope of a sliding side of the asymmetrical teeth is substantially larger than the helix angle of the screw/nut system.

9. The metallic locking washer of claim 1, wherein a distance between two consecutive ridges or grooves, or between two peaks, is comprised on average between 10 microns to 1 millimeter.

* * * * *